March 11, 1930.  C. A. McGEEHAN ET AL  1,750,185
FILTERING DEVICE
Filed Aug. 22, 1927  2 Sheets-Sheet 1
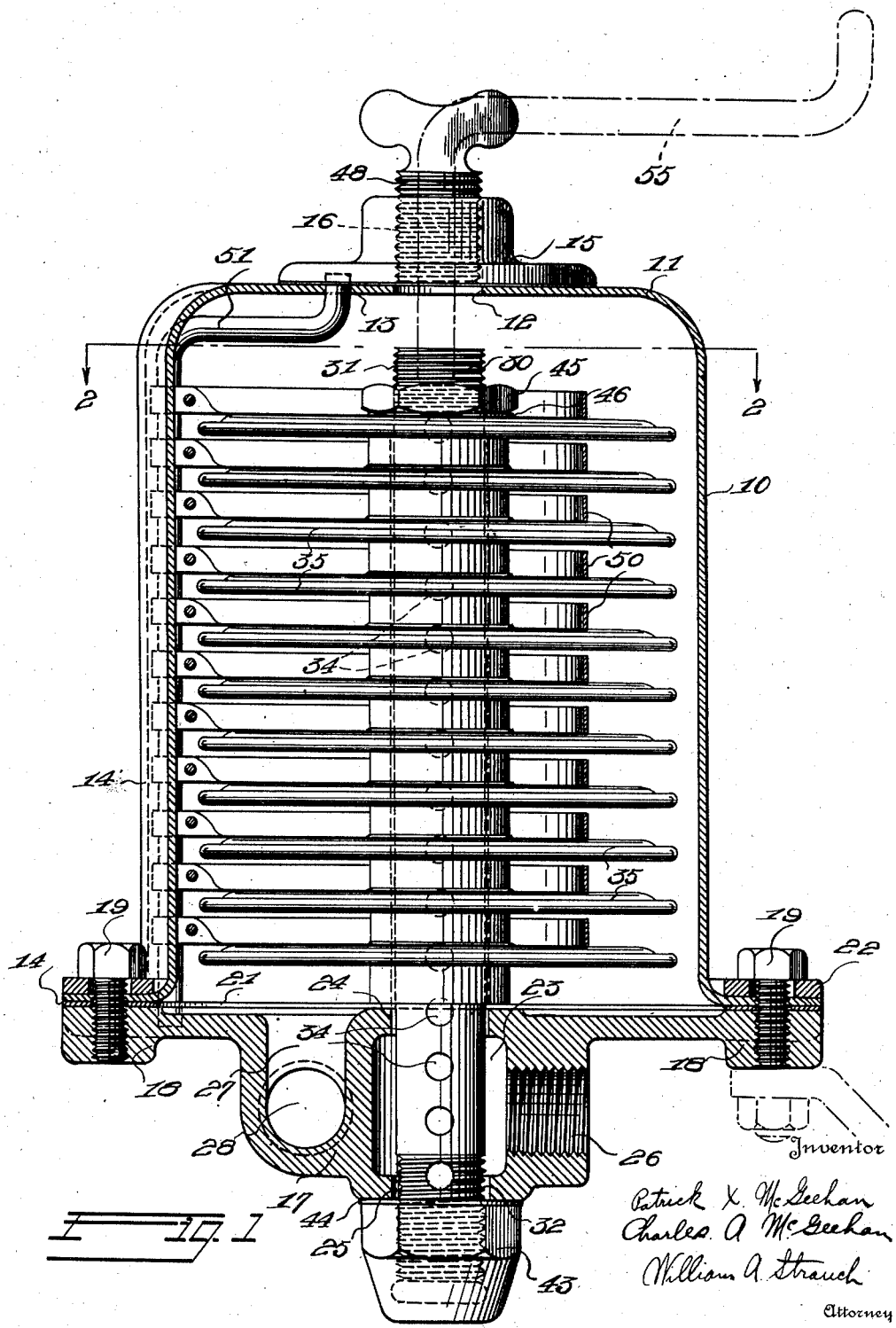

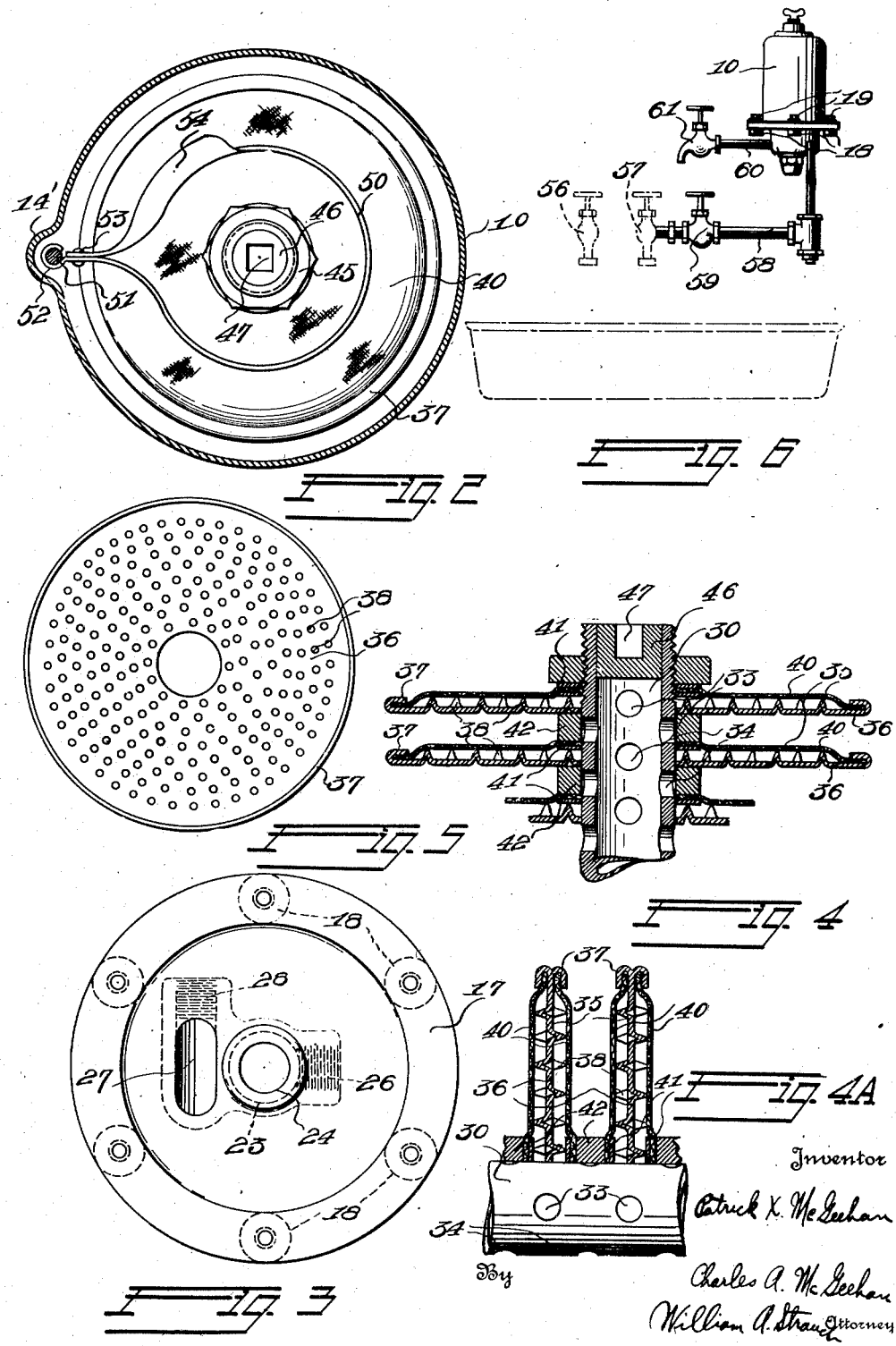

Patented Mar. 11, 1930

1,750,185

UNITED STATES PATENT OFFICE

CHARLES A. McGEEHAN, OF MORRISTOWN, AND PATRICK X. McGEEHAN, OF HAZLETON, PENNSYLVANIA

FILTERING DEVICE

Application filed August 22, 1927. Serial No. 214,754.

The present invention relates to filtering devices and filter aids, and more particularly relates to filtering devices and filtering aids for the treatment of liquids particularly applicable for home use but useful in other relations.

Various forms of filtering devices have been heretofore proposed for use in households and like purposes, but none of such prior filters have been of a form adapted for ready cleaning, or for the use of filter aids essential to the proper purification of contaminated water.

A primary object of the present invention is to provide a simple, effective filter that is easily operated, readily cleaned and accessible, and which is compact and durable.

Another object of the invention is to provide a filter which while sufficiently compact in form is adapted to be readily connected in a kitchen sink without causing undue obstruction, is provided with ample filtering area to supply the full volumetric requirements of a home for filtered water as required.

Still another object of the invention is to provide a filter in which a suitable filter aid may be utilized for separating substantially all insoluble matter including germ life suspended in the water, to the extent that contaminated water may be rendered safe for drinking purposes.

A further object of the invention is to provide a filtering device that may be readily charged with filter aids and provided with means whereby the filter aids after they have become ineffective can be easily and quickly discharged, the filter cleaned, and then recharged with a new filter aid.

Still a further object of the invention is the provision of novel filter aids especially adapted for use with our improved filtering devices, which may be readily and conveniently charged into and discharged from our improved filtering device.

With these objects in view, together with such other objects as will become apparent to those skilled in the art from the following disclosure and the terms of the appended claims, reference will be had to the accompanying drawings forming a part of our invention, in which—

Figure 1 is substantially a central vertical section through the filter shell and filter aid discharging members of a preferred embodiment of the invention, the filter elements being shown in side elevation.

Figure 2 is a longitudinal sectional view taken on line 2—2 of Figure 1.

Figure 3 is a top plan view of the lower casting for the form of invention shown in Figure 1.

Figure 4 is a fragmentary vertical sectional view through the central perforated pipe, the filter elements and spacers therebetween.

Figure 4A is a fragmentary sectional view of a modified form of invention.

Figure 5 is a top plan view of one of the filter element trays, and

Figure 6 is a side elevational view of the filter assembled ready for use.

Referring to the drawings by reference characters, in which like characters designate like parts, 10 designates a sheet metal shell adapted to enclose the filter elements hereinafter referred to and is provided with a closed top 11 provided with a central aperture 12 and a smaller aperture 13 for purposes hereinafter referred to.

The bottom of shell 10 is open and the shell provided with a laterally extending flange 14, and an outwardly extending channel section 14' (Figures 1 and 2). A casting 15, preferably of aluminum is suitably secured to the top 11 of the shell 10 and is provided with a centrally located threaded hole 16 in register with the aperture 12.

A bottom casting 17 is provided, and this casting is provided with a plurality of tapped bosses 18 adapted to receive cap screws 19 which extend through the flange 14 and secure the lower casting to the shell. A suitable gasket 21 is interposed between the flange and shell to make a water tight joint and a securing and stiffening ring 22 is provided against which the heads of cap screws 19 seat in order that a water tight joint may be provided.

Bottom casting 17 is provided with a central chamber 23 connected to the upper and lower faces of the casting by means of passages 24 and 25 respectively. Extending horizontally through casting 17 from the compartment 23 is a threaded outlet hole 26. Casting 17 is further provided with a passage 27 which communicates with the upper face of the casting and extending from the bottom of the portion 27 horizontally through the casting at right angles to opening 26 is a threaded inlet opening 28.

Extending centrally through the shell 10 is a hollow pipe 30 which at its upper end terminates slightly below the top 11 of shell 10 in alignment with the aperture 12 and at its lower end extends through the aligned apertures 24 and 25 in the casting 17 and projects below the bottom of said casting. Both ends of the pipe 30 are threaded as indicated at 31 and 32 respectively, and intermediate its ends the pipe is provided with two series of laterally extending perforations 33 and 34, the perforations of one series being out of horizontal alignment with and extending at right angles to the perforations of the other series.

Pipe 30 is adapted to support a plurality of vertically spaced filter elements 35 (Figures 1 and 4). Each filter element comprises a tray 36 (Figure 4) provided with a marginal flange 37 and having in the base thereof numerous fairly sharp spaced projections 38 which are formed by punching up the material of the base portion in which operation care must be taken that the tray be not punctured causing leaks. Resting on the apices of the projections 38 of each tray 36 is a filter medium 40 over the margin of which the flange 37 is crimped as indicated in Figure 4. The filter media may be made of Monel woven wire cloth, or any other finely woven metal wire cloth, preferably a rolled metal cloth, although a suitable cotton woven cloth can also be effectively employed.

Interposed between the filter medium 40 and the projections 38 is a thin sheet metal washer 41 having non-corrosive properties, and disposed between the filter elements 35 and surrounding the perforated pipe 30 are a plurality of spacers 42 of the same diameter as the washer 41. The lower end of pipe 30 is closed by means of a cap nut 43 between which and the bottom of casting 17 a gasket 44 is placed to make a water tight joint.

A lock nut 45 engages the upper threaded end of the pipe 30 and is drawn down against a washer 46 which in turn engages the upper filter element. Thus when the nut 45 is turned down tight the nut 43 is drawn tightly against the bottom of casting 17 and the filter elements 35 and spacers 42 drawn into liquid tight engagement between the nut 45 and top of casting 17.

By arranging the perforations 33 and 34 out of longitudinal alignment some of them will always communicate with the filter elements no matter how the elements are placed on the pipe, and the parts will be so clamped in position that liquid is forced to pass through the filtering media 40 before it can enter through openings 33 and 34, and pass out through pipe 30. The top of pipe 30 is closed by means of a plug 46 having a square recess 47 therein for a purpose hereinafter set forth and a threaded plug 48 engages and closes the hole 16 in top casting 15.

In the preferred embodiment of our invention, as will more fully hereinafter appear, filter aid is utilized, which after a time loses its effectiveness. The old filter aid must then be removed and a new charge supplied. Accordingly our preferred form of invention includes discharging means for removing the filter aid which comprise a plurality of phosphor bronze spring strips 50 curved about central pipe 30 and loosely looped about rod 51 nested in the channel 14' of the shell 10. The lower end of rod 51 is seated in casting 17 and its upper end extends aperture 13 of top 11 and a recess in top casting 15. A strip 50 is provided for each filter element and each strip has its lower edge in close proximity to a filter medium 40 as indicated in Figure 1. Each strip 50 is provided with an eye 52 loosely engaging pin 51 and the terminal of the strip is secured to the body thereof adjacent the eye 52 by a rivet 53 as indicated in Figure 2. At one side thereof each strip is bent at right angles as indicated at 54 in order that the coating of filter aid formed within the loop of the strip can find its way out when discharging the old filter aid.

The filter elements 35 as shown in Figure 4A may be made double, that is, a filter medium 40 arranged on each side of each disc or tray 35. When using the double filter elements the discharge strips 50 are arranged so that each strip will clear a pair of adjacent filtering media 40 during the discharging operation. In utilizing this form of the invention it is preferable to arrange the pipe 30 horizontally and consequently the filter elements 35 vertically.

In Figure 6 the application of our invention for household purposes is illustrated from which it will be noted that the filter can be installed above the ordinary kitchen sink without undue obstruction. As will be seen, 56 designates the hot water tap and 57 the cold water tap of an ordinary household sink arrangement into the cold water pipe of which our improved filter is connected. A pipe 58 provided with a valve 59 is connected between the cold water line and the inlet opening 28 of the filter, and a pipe 60 having a faucet 61 is connected with the outlet 26 of the filter. In order to effect thorough filtering and to deprive the water of all objectionable matter a filter aid is employed which is adapted to rest upon the filter media 40. To be suitable for use with our invention, the filter aid must have the property of forming a suspension in the liquid to be filtered, but as the liquid passes through the filter media 40, the filter aid must adhere to and form a coating on the filter media.

Exhaustive tests have been conducted with various filter aids including ground wood paper pulp, sulphite, sulphate, and diatomaceous earths and clays treated and untreated, finely powdered vegetable and bone carbon and charcoals. While various combinations of filter aids mentioned may be utilized, we have discovered that especially good results are secured by use of a filter aid composed of approximately 45% supercell, approximately 45% filter cell, approximately 6% vegetable char, and approximately 4% clay. Supercell is a commercial diatomaceous earth treated to increase its porosity. Filter cell is an older product on the market and is more impervious than supercell. For vegetable char Suchar is very good, and Floridin makes an excellent clay for this purpose. The chars utilized are preferably fine enough to pass a 150 mesh screen. To charge the device with filter aid, sufficient filter aid is mixed with water to form a precoating on the filter media and the mixture is poured into the top of the device through the hole 16 after which the plug 48 is turned into said hole. The water inlet valve is then opened after which the outlet valve is opened, and a coating of filter aid forms over the filter media. After about thirty seconds with an ordinary household size filter, the filtrate issuing from the outlet valve is practically sterile. With our preferred mixture of filter aid only a maximum precoating of one-eighth inch thickness is required.

In using the discharging device after the effectiveness of the filter aid has been spent, plug 48 is removed and a square ended wrench 55 indicated by dot and dash lines in Figure 1 is inserted in hole 16 and engaged in recess 47 after which nut 43 is slacked off whereupon the wrench is turned causing the filter elements to revolve about the axis of pipe 30.

When draining off filtered water the inlet should always be opened first which eliminates the possibility of disturbing the precoating on the filter elements. Upon revolving the filter elements the discharging strips 50 will dislodge the old filter aid on the media 40 and the filter aid within the loops of the strips will pass out at the right angularly turned portions 54. After the wrench has been turned several times in each direction, the water is then drained out of the filter body through the inlet opening 28. During the draining the wrench should be turned several times in each direction. After draining has been completed nut 43 should be well tightened and the wrench removed, and the filter is then ready to be charged with new filter aid.

The filter aid mixture is now mixed as above set forth, poured into the top of the filter, plug 48 is inserted in tapped hole 16, and the inlet to the filter is opened. The outlet of the filter is then opened for a period of from thirty to thirty-five seconds and then shut off. The filter outlet should always be shut off before the inlet is closed. The filter is then ready for use. When draining off filtered water the inlet should always be opened first which eliminates the possibility of disturbing the precoating on the filter elements.

In operation, the water to be filtered enters the filter through the line 58 and passes upward through the recess 27 in casting 17 into the shell 10.

As the water cannot pass through the trays 36 it is compelled to find its way through the filter media 40 whereupon it enters the trays 36 and from thence passes through the perforations 33 into the pipe 30 from which it emerges through the lower perforations into the compartment 23 from which it is drawn through the line 60 and faucet 61.

It is to be noted that a large number of filter elements are provided each having a relatively large filter area and consequently the combined filter area is large and as a result thereof the water is filtered practically as fast as it is usually used.

While we have disclosed specific embodiments of our invention it is to be understood that our invention is not limited to the disclosed details, but as will be apparent to those skilled in the art, wide departures and modifications may be made which fairly fall within the scope of the appended claims which in terms define the scope of our invention.

Accordingly, what is desired to be secured and is claimed as new is:

1. A filter comprising a shell having a substantially closed end and an outwardly flanged open end; a tapped casting secured to said closed end; a casting provided with inlet and outlet openings and an opening in alignment with the tap in said first mentioned casting secured to said flange; a perforated terminally threaded pipe disposed within said shell in alignment with the said aligned tap and opening and extending through and inwardly of said second mentioned casting; a plurality of alternately arranged filter elements and spacers surrounding said pipe and engaging the inner face of said second mentioned casting, a cap nut threaded on the outer end of said pipe and resting against the outer face of said second mentioned casting; and a lock nut engaging the inner end of said pipe adapted to firmly hold said filter elements and spacers in assembled relation.

2. The device set forth in claim 1 in which the shell is provided with a filter aid discharging device adapted to cooperate with the surfaces of the filter elements to dislodge the spent filter aid.

3. A filter comprising a shell having a closed end an an open end, a bottom casting secured to the open end of shell, and provided with inlet and outlet passages, a perforated pipe extending centrally within the shell and through the casting, a plurality of filter elements carried by the pipe in vertical spaced relation; spacers surrounding the pipe and interposed between the filter elements, and a normally closed opening in the closed end of said shell, said opening being in alignment with said perforated pipe, whereby filter aid may be inserted into said casing through said opening, and a removable tool may be inserted therethrough for rotating said shaft.

4. A filter comprising a casing; a perforated pipe extending within said casing supporting a plurality of alternately arranged filter elements and spacers; and a plurality of members interposed between said filter elements arranged to cooperate with the surfaces of said filter elements to free them from coatings of material accumulating thereon, said pipe having means at one end thereof for the ready reception of manually operable means to rotate said pipe to clean said filter elements, said pipe end terminating within said casing, and removable means on said casing for exposing the said end of the pipe for rotating said pipe for cleaning said filter elements of filter aid and for charging the filter with filter aid.

5. In a filter, a filter aid discharging device comprising a supporting rod; a plurality of metallic strips loosely carried by said rod; and each having a scraping surface comprising a relatively large closed loop portion, a portion of each loop being flattened.

6. In a filter, a filter element comprising an unperforated tray member provided with a multiplicity of outwardly extending knotlike protuberances and a marginal flange, a filter medium superposed on said tray member in engagement with said protuberances and retained by said flange.

7. A filter comprising an elongated casing, a centrally disposed hollow shaft in said casing and projecting beyond said casing at one end thereof, said projecting end constituting the liquid outlet of said filter a liquid inlet in the end of said casing and adjacent the said outlet, a plurality of filter elements mounted on said shaft and adopted to receive a filter aid, a normally closed opening at the opposite end of said casing for charging filter aid suspended in liquid into said casing, and means for dislodging the filter aid from said filter elements including means for rotating said shaft by detachable means engageable therewith through said normally closed opening and discharging said filter aid through said liquid inlet.

In testimony whereof we affix our signatures.

CHAS. A. McGEEHAN.
PATRICK X. McGEEHAN.